United States Patent
Mao

(10) Patent No.: US 7,199,833 B2
(45) Date of Patent: Apr. 3, 2007

(54) METHOD OF USING THREE-DIMENSIONAL IMAGE INTERPOLATION ALGORITHM TO ACHIEVE FRAME RATE CONVERSIONS

(75) Inventor: Ching-Lung Mao, Taipei (TW)

(73) Assignee: Primax Electronics Ltd., Taipei (TW)

( * ) Notice: Subject to any disclaimer, the term of this patent is extended or adjusted under 35 U.S.C. 154(b) by 535 days.

(21) Appl. No.: 10/609,602

(22) Filed: Jul. 1, 2003

(65) Prior Publication Data
US 2005/0001930 A1    Jan. 6, 2005

(51) Int. Cl.
*H04N 7/02* (2006.01)
*H04N 11/20* (2006.01)
*H03L 7/00* (2006.01)

(52) U.S. Cl. ............ 348/441; 348/451; 348/452; 348/458; 348/538; 348/701; 382/300

(58) Field of Classification Search ............ 348/441, 348/447, 451–452, 458–459, 538, 699–702; 382/300
See application file for complete search history.

(56) References Cited

U.S. PATENT DOCUMENTS

| | | | |
|---|---|---|---|
| 5,444,491 A * | 8/1995 | Lim | 348/441 |
| 5,621,470 A * | 4/1997 | Sid-Ahmed | 348/448 |
| 5,796,439 A * | 8/1998 | Hewett et al. | 348/459 |
| 5,999,220 A * | 12/1999 | Washino | 348/441 |
| 6,438,275 B1 * | 8/2002 | Martins et al. | 382/300 |
| 2002/0118745 A1 * | 8/2002 | Takahashi et al. | 375/240.02 |
| 2003/0095202 A1 * | 5/2003 | Ferguson | 348/441 |
| 2003/0202780 A1 * | 10/2003 | Dumm et al. | 386/112 |

* cited by examiner

*Primary Examiner*—Brian P. Yenke
(74) *Attorney, Agent, or Firm*—Rabin & Berdo P.C.

(57) ABSTRACT

This specification discloses a method that uses three-dimensional image interpolation algorithm implemented in an image player to solve the problem of frame rate conversions between output contents and the image player. It aims to achieve high resolutions and high frame rates. The disclosed method adjusts the frame resolution and frame rate of the received image data according to the playing format of the image player. That is, the pixel values contained in a frame are interpolated to generate several interpolated pixel values in order to fit with the frame resolution. The interpolated frame is then stored. The next two consecutive frames are further extracted. The central position is determined according to the frame playing frequency. The corresponding pixel values of the two consecutive frames are used to produce several interpolated pixel values. The interpolated pixel values form an interpolated frame, which is then saved.

1 Claim, 5 Drawing Sheets

METHOD OF USING THREE-DIMENSIONAL IMAGE INTERPOLATION ALGORITHM TO ACHIEVE FRAME RATE CONVERSIONS

BACKGROUND OF THE INVENTION

1. Field of Invention

The invention relates to a method of frame rate conversions and, in particular, to a method that utilizes a three-dimensional image interpolation algorithm to achieve the frame rate conversions.

2. Related Art

With the advance in technology, the quality of audio/video (AV) playing devices has also greatly improved. From the early video tapes to recent VCD's DVD's, storage media become more compact in size but larger in capacity. They provide users or consumers with more convenient storage media for carriage and better AV playing quality. However, one cannot neglect the operation efficiency of the data processing unit inside the AV playing devices. The large AV data have to be accompanied with an AV player with a powerful data processing unit, a high-resolution display and continuous frame playing.

Generally speaking, there often have problems about specification differences between AV data extraction and frame display. The specification differences include resolution and frame rates. Currently, frame pixel values are mostly adjusted using two-dimensional image interpolation methods. The method also duplicates frames close in the time axis, as shown in FIG. 1. In the drawing, F1 and F2 are frames that exist in the AV playing contents. F1' is the frame formed by interpolating pixels along the time axis. The interpolation is done between F1 and F2. If the frame interpolation position determined by considering the frame rate playing speed is closer to F1, the interpolated frame F1' is obtained by copying the corresponding pixels in F1. The rest frames are also formed in this manner. Although this method is more economical in operations and does not cause burdens for the system, it nevertheless cannot fully utilize the powerful operating unit of the AV player. Therefore, it is a kind of hardware waste.

SUMMARY OF THE INVENTION

In view of the foregoing, the invention provides a method of using a three-dimensional image interpolation algorithm to achieve frame rate conversions. In accord with the playing specifications of the AV player, the invention performs adjustments for the frame resolution and frame rate of the input AV data. The pixel values contained in a frame are interpolated to generate several interpolated pixel values in order to fit with the frame resolution. The interpolated frame is then stored. The next two consecutive frames are further extracted. The central position is determined according to the frame playing frequency. The corresponding pixel values of the two consecutive frames are used to produce several interpolated pixel values. The interpolated pixel values form an interpolated frame, which is then saved.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
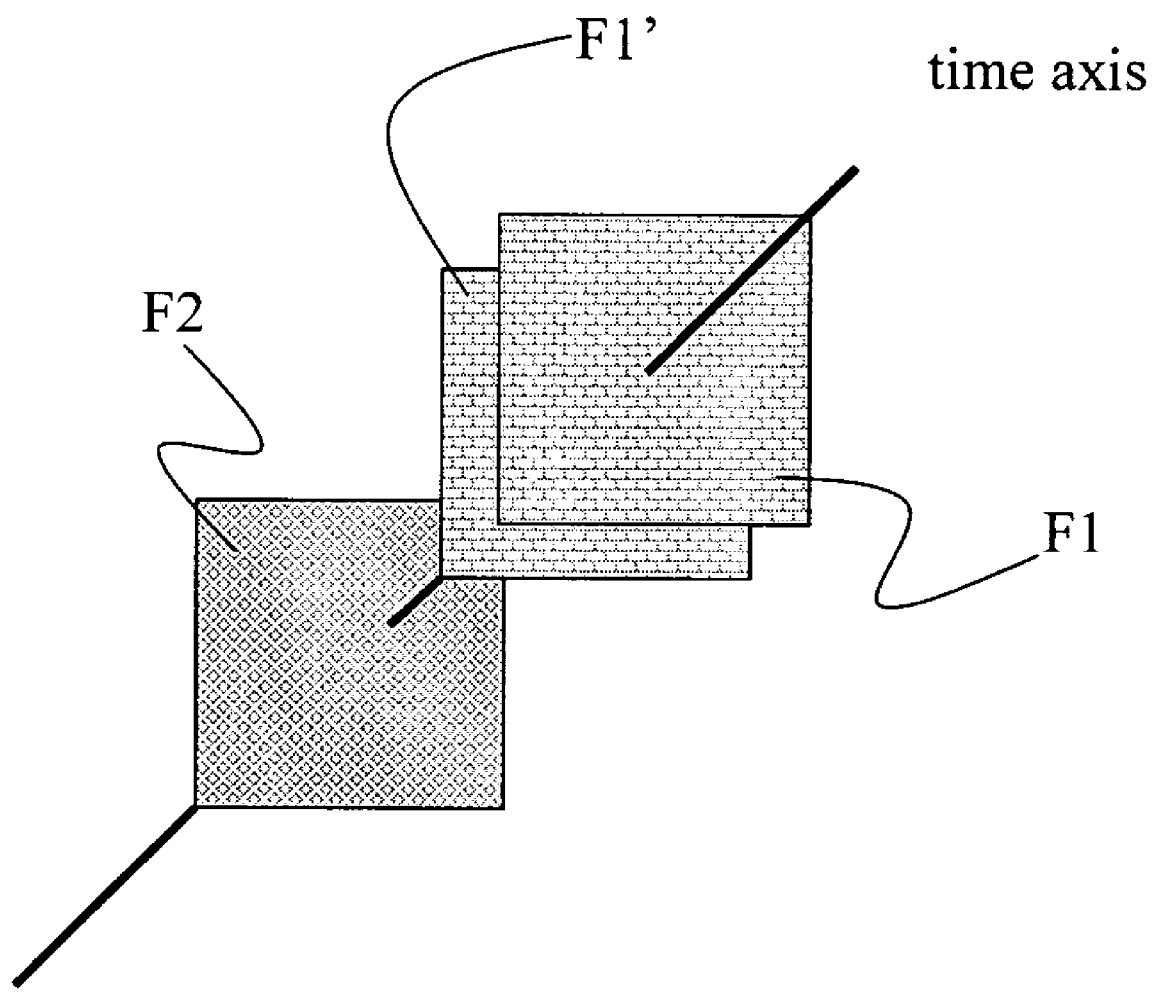
FIG. 1 is a schematic view of the frame interpolation method in the prior art.
Figure 2:
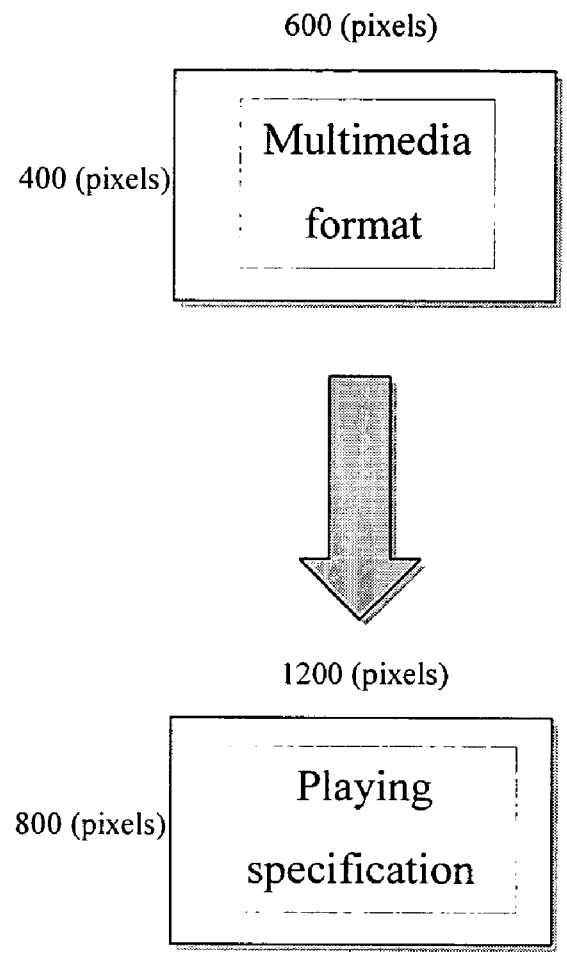
FIG. 2 is a schematic view of resolution adjustment for a screen with the same size.
Figure 3:
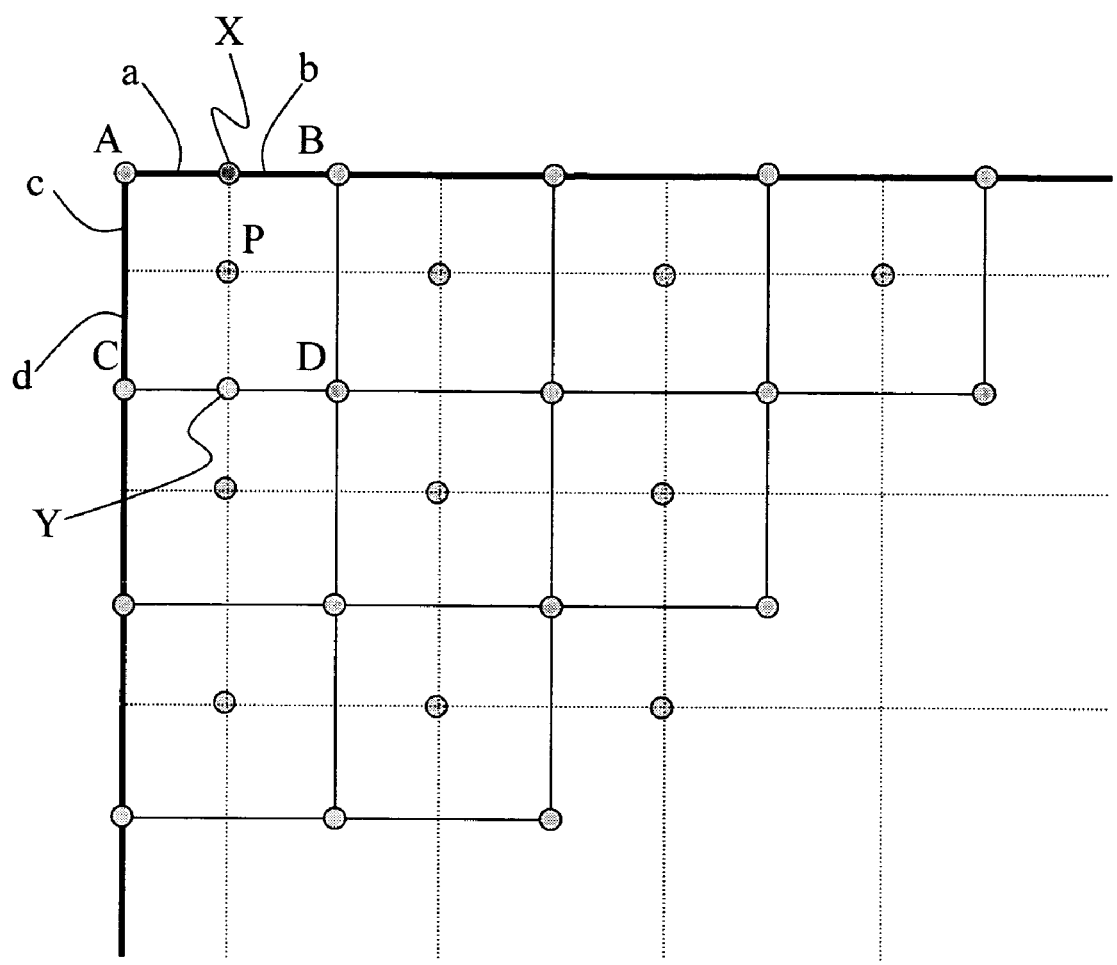
FIG. 3 is a schematic view of the positions of interpolated pixels.

The invention relates to a method of frame rate conversions and, in particular, to a method that utilizes a three-dimensional image interpolation algorithm to achieve the frame rate conversions. With reference to FIG. 2, the multimedia format of AV data for normal image players (such as televisions, liquid crystal projectors) is 600(pixels)×400 (pixels). Their frame rate is 40 fps (frames per second). However, they are output via a device with the playing specification of 1200(pixels)×800(pixels). To achieve the high-resolution effect with a frame rate of 80 fps, the AV player needs the help of using an interpolation algorithm to process data. Please refer to FIG. 3. In the drawing, a, b, c, and d are the ratios of the point P from points A, B, C, and D. Taking FIG. 2 as an example, to double the number of pixels along both length and width for a frame of the same size, the pixel distance must be decreased by a factor of two. That is, the 600 pixels in the horizontal direction have to be interpolated and expanded to 1200 pixels. In this case, a can be the unit distance between two pixels in the new frame, i.e. 600/1200. On the other hand, b is 1−(600/1200). Therefore, a and b have a linear relation for the pixels in the original frame. From the pixel values of A and B, the pixel value of a virtual pixel X can be computed:

$$X=A*(b/a+b)+B*(a/a+b).$$

On the other hand, another virtual pixel Y along the horizontal line is $$Y=C*(b/a+b)+D*(a/a+b).$$

Moreover, these two virtual pixels X and Y are used to compute the interpolated pixel value of point P according to the ratio change (from 400 pixels to 800 pixels in the vertical direction):

$$P=X*(d/c+d)+Y*(c/c+d)=(A*(b/a+b)+B*(a/a+b))*(d/c+d)+(C*(b/a+b)+D*(a/a+b))*(c/c+d)$$

This is the two-dimensional image interpolation algorithm. The important point is that surrounding pixels are used generate a new pixel through interpolation in order to satisfy the resolution requirement of the AV player. Each frame is thus processed to have all the necessary interpolated pixels. Further adjustments are performed according to the frame rate.

Figure 4:
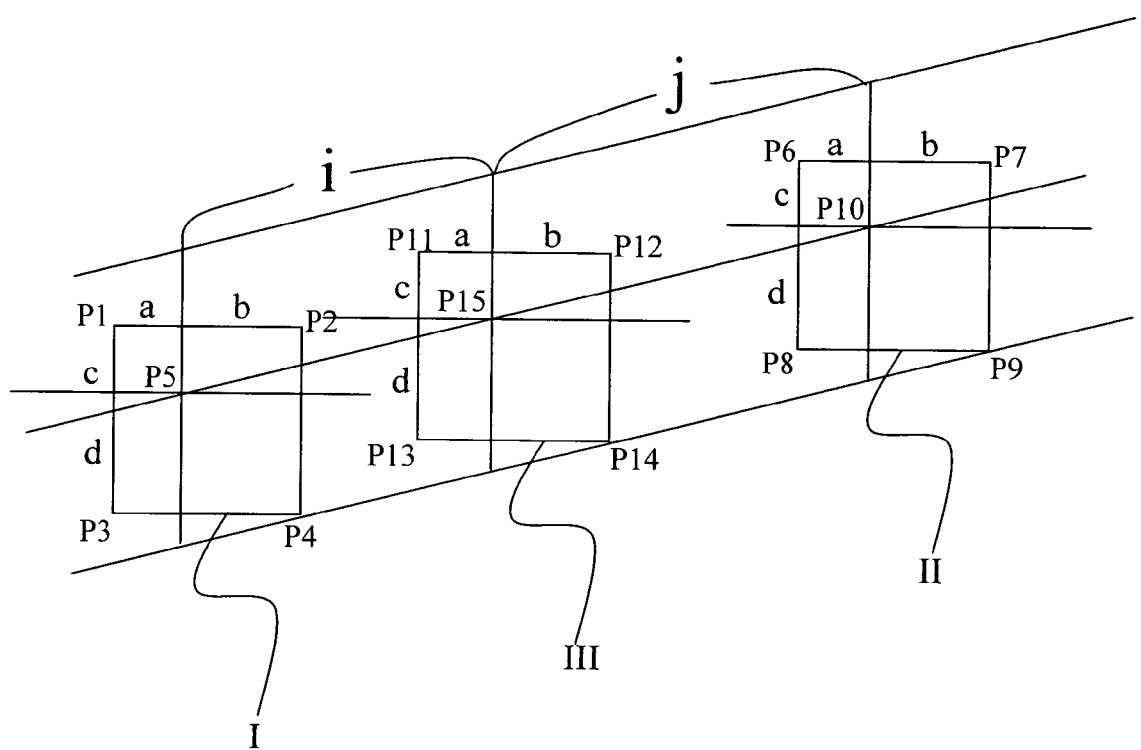
FIG. 4 is a schematic view of the interpolated frames using the disclosed three-dimensional image interpolation algorithm to achieve the frame rate conversions.

With reference to FIG. 4, pixels P1 through P10 are pixels that actually exist in the AV data; pixels P11 through P15 are the interpolated pixels produced using the disclosed method. I and II are blocks formed from pixels actually existing in the AV data; while III is a block formed from the interpolated pixels produced using the disclosed method. The variables i and j are the ratios obtained from frame rate changes along the time axis. Explicitly, $$i=\text{(the frame rate of the input } AV \text{ data)/(the frame rate of the } AV \text{ player)},$$

$$j=1-i.$$

The variables a, b, c, and d are the pixel span ratios obtained after the resolution change. Using the disclosed method, one can obtain block III from blocks I and II.

Figure 5:
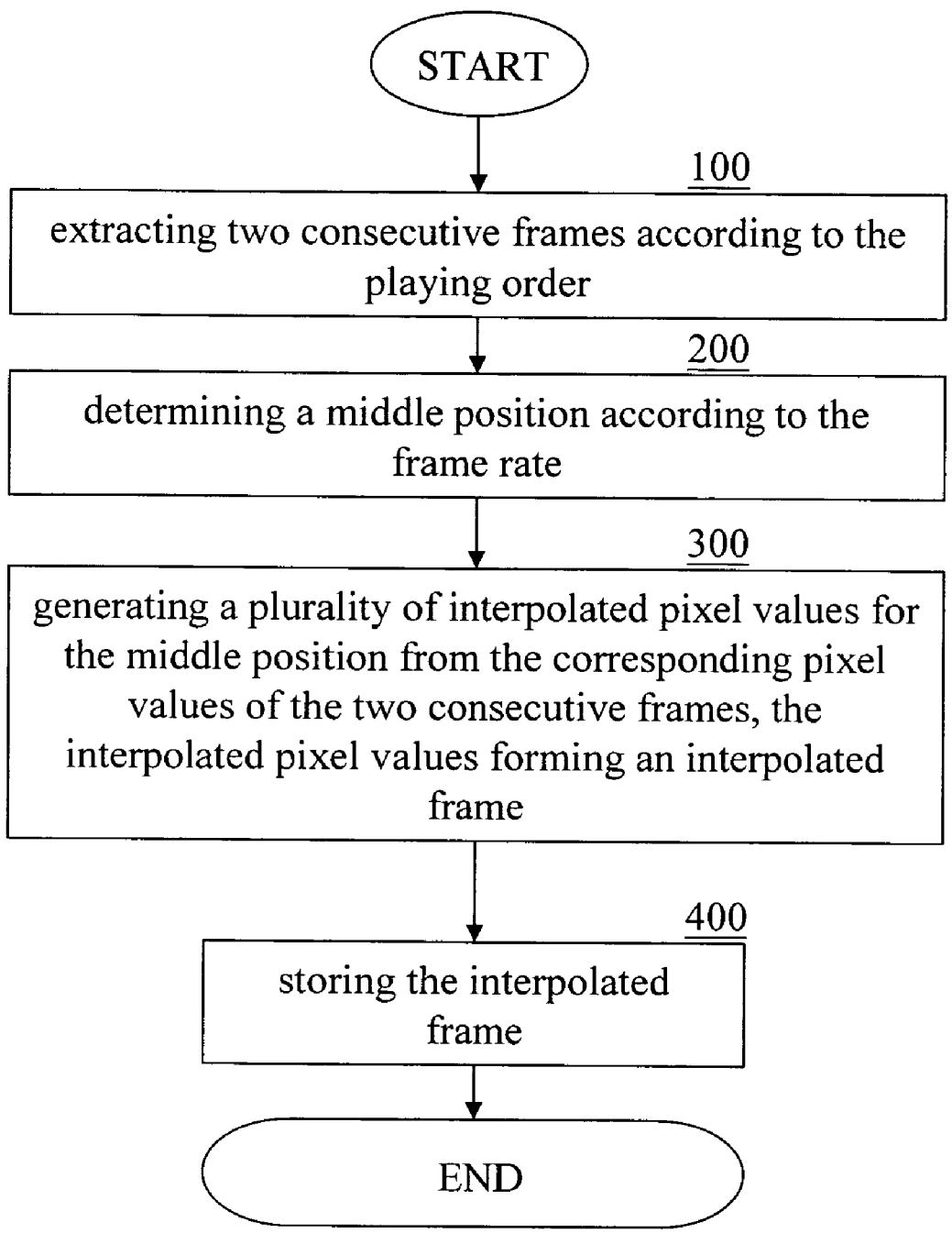
FIG. 5 shows the flowchart of the disclosed method.

With simultaneous reference to FIGS. 4 and 5, we use one block in the frame to explain the invention. The formulae for generating the interpolated pixels P5 and P10 are:

$$P5=(P1*(b/a+b)+P2*(a/a+b))*(d/c+d)+(P3*(b/a+b)+P4*(a/a+b))*(c/c+d),$$

$$P10=(P6*(b/a+b)+P7*(a/a+b))*(d/c+d)+(P8*(b/a+b)+P9*(a/a+b))*(c/c+d).$$

The frame with the interpolated pixels is then stored in the buffer memory of the AV player. Afterwards, two consecutive frames I, II are extracted according to the playing order (step 100). The middle position is determined according to the frame rate (step 200). If the frame rate of the original AV data is 40 fps and will be changed to 70 fps, then the playing time between two frames is shortened by a factor of 40/70=4/7. That is between the first frame I and the second frame II, a frame III is inserted between the first and second frames I, II. The interval between frame III and frame I is 4/7 of that between frame II and frame 1. The positions of other interpolating frames are also determined in this way. The corresponding pixels on the two consecutive frames are used to generate several interpolated pixel values at the middle positions. These interpolated pixels constitute an interpolated frame (step 300). The calculation method for the pixels is $$P15=P5*j/(i+j)+P10*i/(i+j)$$

Here P15 is the interpolated pixel value. This kind of pixel values forms the interpolated frame III from the two consecutive frames I, II. Finally, the interpolated frame III is stored in the memory of the AV player (step 400). This completes the procedure in the disclosed method.

Certain variations would be apparent to those skilled in the art, which variations are considered within the spirit and scope of the claimed invention.

What is claimed is:

1. A method utilizing a three-dimensional image interpolation algorithm to achieve frame rate conversions, which adjusts a resolution and a frame rate of received input audio/video (AV) data, generates a plurality of interpolated pixel values from a plurality of pixel values in a frame to fit the resolution and a frame rate of an AV player, and stores the new frame, wherein the method comprises the following steps:

extracting two consecutive frames according to a playing order;

determining a middle position according to the frame rate of the input AV data and the frame rate of the AV player;

generating a plurality of interpolated pixel values for the middle position from corresponding pixel values of the two consecutive frames, the interpolated pixel values forming an interpolated frame; and storing the interpolated frame, wherein the interpolated pixel value is determined from the corresponding pixel values in the two consecutive frames using the following formula $$P_{int}=P_{first}*j/(i+j)+P_{next}*i/(i+j),$$

where $P_{int}$ is the interpolated pixel value. $P_{first}$ and $P_{next}$ are the pixel values for interpolation, and i and j are ratios generated by adjusting the frame rate, and wherein i=(the frame rate of the input AV data)/(the frame rate of the AV player), j=1−i.

* * * * *